United States Patent [19]

Riché

[11] Patent Number: 4,813,377

[45] Date of Patent: Mar. 21, 1989

[54] AQUACULTURE HARVESTER FOR SHALLOW WATER USE

[76] Inventor: Allen G. Riché, 151 S. Beadle Rd., Lafayette, La. 70508

[21] Appl. No.: 148,960

[22] Filed: Jan. 27, 1988

[51] Int. Cl.⁴ ............................................. A01K 61/00
[52] U.S. Cl. ............................................. 119/3; 37/55
[58] Field of Search ....................... 119/2, 3, 4; 56/8, 9; 37/55, 119, DIG. 8; 43/4, 4.5

[56] References Cited

U.S. PATENT DOCUMENTS

| | | | |
|---|---|---|---|
| 734,571 | 7/1903 | Knapp | 37/119 |
| 3,561,150 | 2/1971 | Silchenstedt | 43/4.5 |
| 3,973,575 | 8/1976 | Sullivan et al. | 37/55 X |
| 4,112,602 | 9/1978 | Kato et al. | 37/55 |
| 4,276,710 | 7/1981 | Yunker et al. | 37/55 X |
| 4,328,629 | 5/1982 | Bruce, Jr. et al. | 37/55 |

FOREIGN PATENT DOCUMENTS 512081  3/1928  Fed. Rep. of Germany ............ 43/4

*Primary Examiner*—Gene Mancene
*Assistant Examiner*—R. Thomas Price
*Attorney, Agent, or Firm*—Cushman, Darby & Cushman

[57] ABSTRACT

As the harvester is propelled forward through a body of shallow water, the water moves over the bottom of the harvester in roughly laminar flow (depth can be up to top of sides) and contacts apex of the vee gutter, and is deflected outward causing an increase in velocity to the constriction points where the ends of the vee gutter legs and curved corner plates coincide in a vertical plane. The lowered static pressure due to increased velocity at trailing edges of vee gutter legs propels the stream upward into a stagnated area behind the apex forming a vortex of counter-clockwise flow to port and clockwise flow to starboard which casts any entrained product such as crayfish into the stagnation area, thereby trapping and preventing any damage to the creatures.

15 Claims, 2 Drawing Sheets

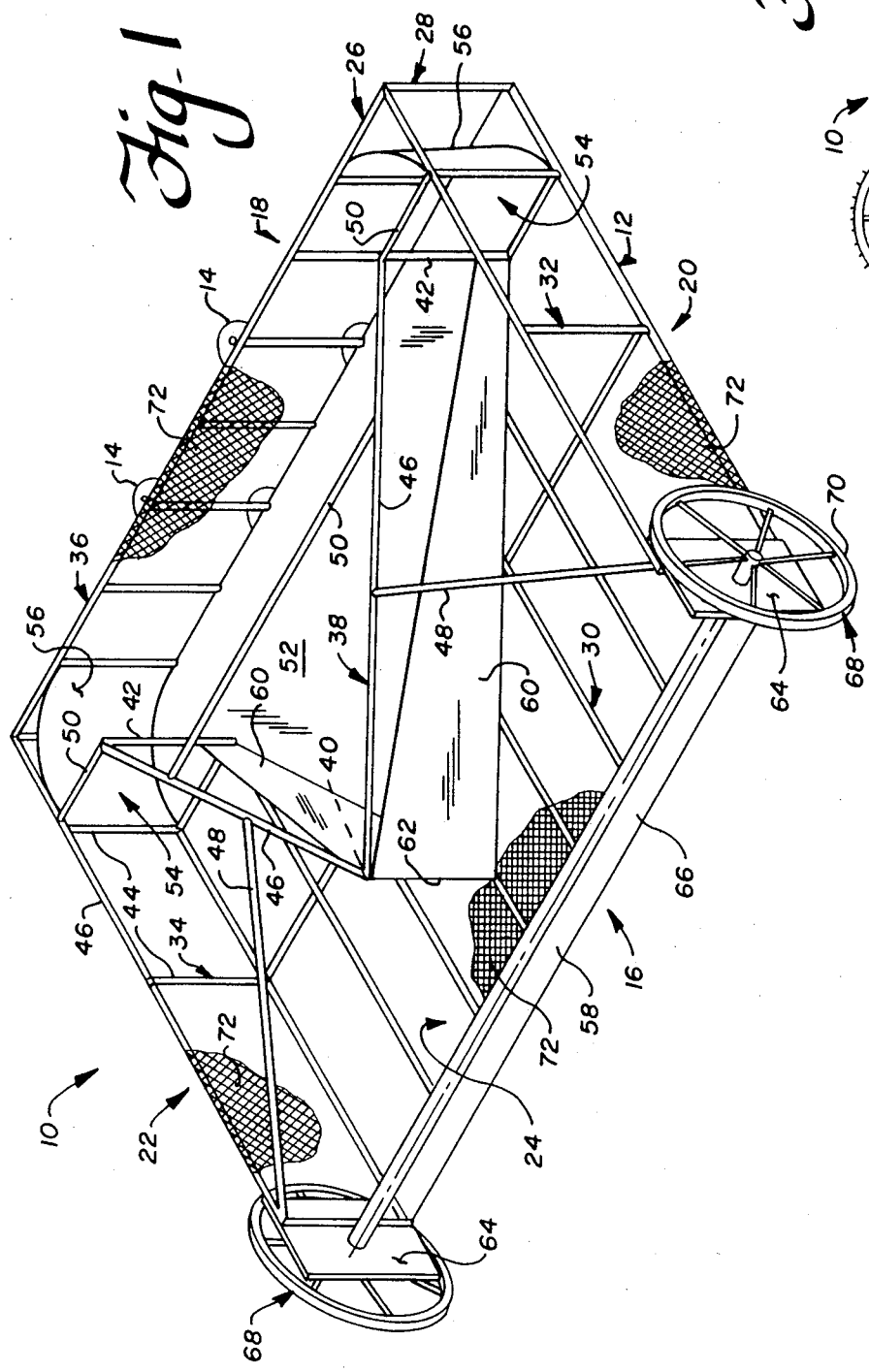
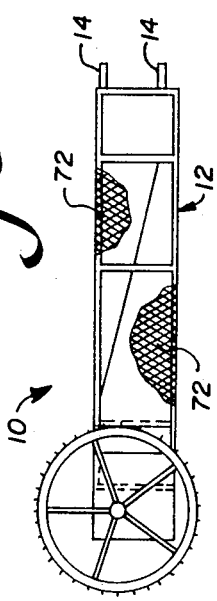

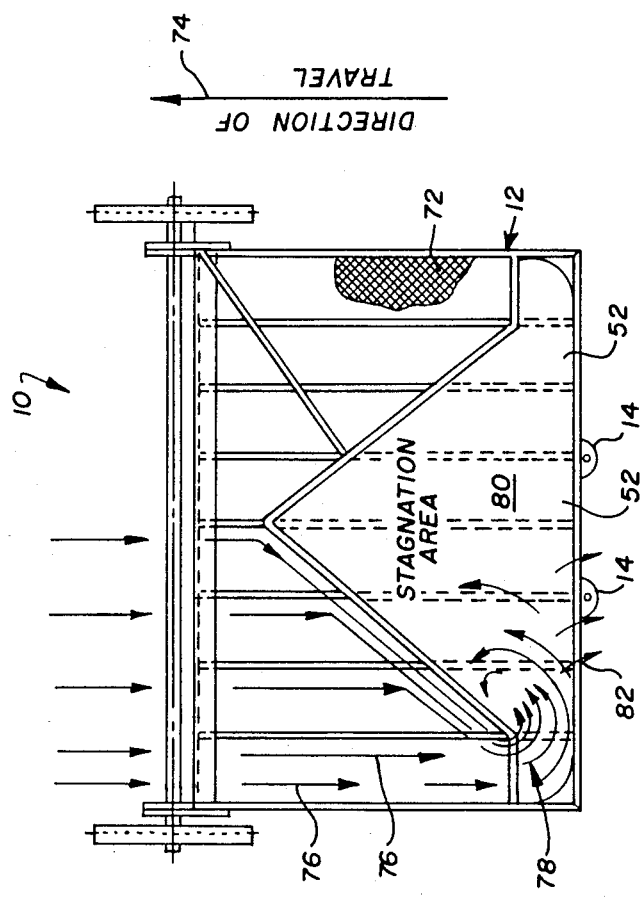
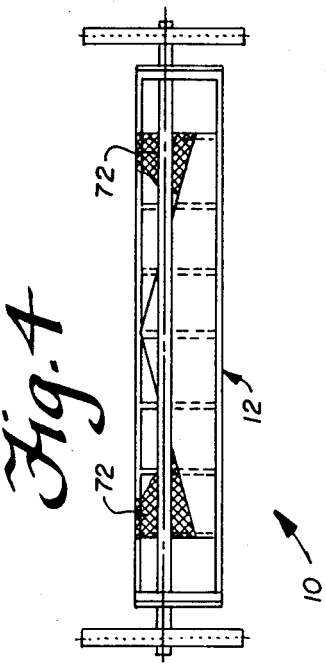
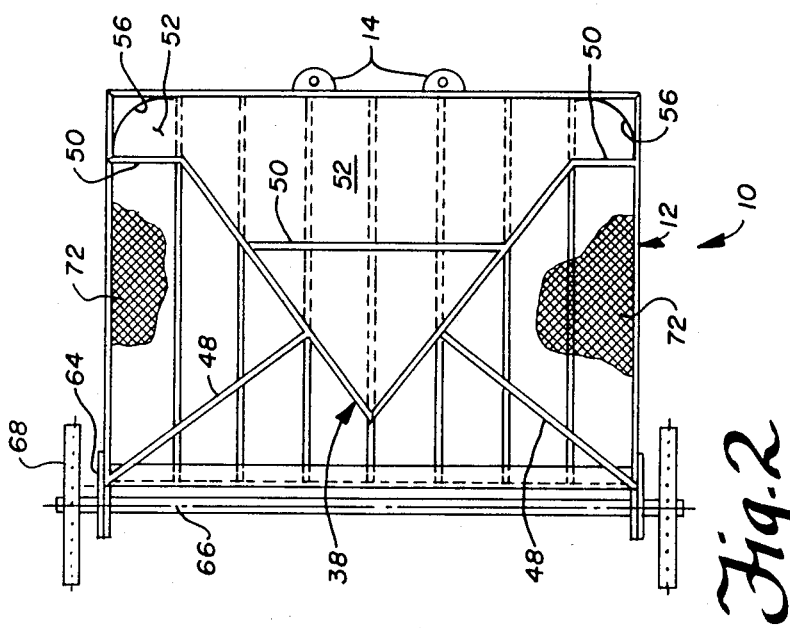

AQUACULTURE HARVESTER FOR SHALLOW WATER USE

BACKGROUND OF THE INVENTION

This invention relates to new and useful improvements in gathering and harvesting crustaceans, fish, and other aquatic fauna grown or found in shallow water.

Aquaculture has become an important world industry within the past twenty years. World demand for seafood products has prompted research into improved and more efficient methods of collecting these creatures while minimizing time, cost and product damage. While initial emphasis is upon the harvest of *Procambius clarkii*, more commonly known as crayfish, fresh or salt water shrimp (*Pinneas sp.*), frogs (*Rana catesreiana*), and crabs (*Callinectes sapidus*) found in tidal flats, lagoons, as well as cultivated in paddies or ponds are all within scope of harvest capabilities of the device herein presented.

For convenience in description, the term "aquatic" will be used herein as generic to natural and artificial bodies of water, whether saline, brackish or fresh, still or aerated, heated, cooled or ambient in temperature. And the term "creature" will be used herein as generic to aquatic fauna whether it swims, floats, crawls, walks or hops.

SUMMARY OF THE INVENTION

As the harvester is propelled forward through a body of shallow water, the water moves over the bottom of the harvester in roughly laminar flow (depth can be up to top of sides) and contacts apex of the vee gutter, and is deflected outward causing an increase in velocity to the constriction points where the ends of the vee gutter legs and curved corner plates coincide in a vertical plane. The lowered static pressure due to increased velocity at trailing edges of vee gutter legs propels the stream upward into a stagnated area behind the apex forming a vortex of counter-clockwise flow to port and clockwise flow to starboard which casts any entrained product such as crayfish into the stagnation area, thereby trapping and preventing any damage to the creatures.

Advantages to be gained by use of the harvester of the present invention may include increasing the area under cultivation which may be profitably tended by one person (thereby increasing the person's productivity), reducing or eliminating the cost for bait needed for trapping or catching the creatures by conventional means, increasing the efficiency of harvesting in terms of yield per unit area, and eliminating much of the discomfort and disease associated with working thigh-deep in an aquatic environment.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings

FIG. 1 is a perspective view of a harvester embodying principles of the present invention;

FIG. 2 is a top plan view thereof;

FIG. 3 is a left side elevational view thereof;

FIG. 4 is a front elevational view thereof;

FIG. 5 is a top plan view of the device, similar to FIG. 2, but bearing flow and direction of travel arrows to facilitate a discussion of normal intended use of the device.

DETAILED DESCRIPTION

The harvester 10 of the present invention comprises an open-fronted box-like scoop 12, and means 14 for mounting the harvester 10 to a propelling vehicle (not illustrated in detail) such as a tractor or shallow-draft hulled water craft. Use of a lug-wheeled tractor having two large diameter non-steered wheels up front and a small diameter castor wheel (or castor wheel pair) at the rear is preferred. Conventionally, such a vehicle carries a motor connected to the wheels for propelling the vehicle, and it has an implement mount to which an implement may be disconnectably connected. By preference, the conventional implement mount is one which may be adjusted in height, e.g. by manipulation of the levers of a conventional hydraulic implement mount system, e.g. such as is conventionally provided on farm tractors equipped with front-end loaders.

For orientation and ease of description, the scoop 12 of the harvester 10 will be described as having a front end 16, a rear end 18, a left side 20, a right side 22, a bottom 24 (and an open top).

The scoop 12 is contructed in part of a frame 26 which may be welded or assembled from sections 28 of aluminum pipe and/or channel members. (Where corrosion is a problem that would lead to an unduly short life for aluminum parts, the device may be made of more corrosion-resistant material, e.g. stainless steel or engineering plastic material. In the preferred construction, the frame sections 28 are assembled to provide a frame that is generally open, but includes a generally planar, horizontal floor portion 30 with generally vertically upstanding open left, right and rear sidewall portions 32, 34, 36 based on the outer periphery of the floor portion. The front end 16 is open.

The frame 26 further includes a vee-gutter or vortex generator portion 38, in the form of triangularly-arranged upstanding posts 40, 42 symmetrically arranged apex-forwards on the floor portion 30, the apex post 40 being located medially and somewhat to the rear of the leading edge of the floor portion 30, and the trailing corner posts 42 being located near, but spaced corresponding short distances in-board of the left and right sidewall portions 32 and 34. The sidewall portions and vee-gutter or vortex generator portion 38 of the frame 26 are shown provided by a combination of upright struts 44 and horizontal struts 46 which run along and interconnect the upper ends of the upright struts 44. Diagonal bracing struts (not shown) may be provided, if desired, dividing the various open rectangles into pairs of complementary open triangles. Additional bracing struts may be provided as needed. For instance, elevated-level bracing struts 48 are shown running from the left and right front corner posts to midpoints of the horizontal struts 46 of the vortex generator portion 38. And elevated-level lateral bracing struts 50 are provided running between the rear corner posts of the vortex generator portion 38 to corresponding upright struts of the left and right sidewall portions 32, 34, and between corresponding intermediate sites on the left and right elevated horizontal members of the vortex generator portion 38.

To impart an appreciation for scale of the preferred embodiment, the scoop 12 may be about eight feet wide, about six feet from front to rear, about one foot four inches in height, the apex of the vortex generator section is located about one foot six inches to the rear of the leading edge of the scoop, and its rear corner posts are located about one foot forwardly of the rear wall portion 36 and one foot in-board of the corresponding sidewall portions 32, 34.

The scoop 12 further includes imperforate wall portions made of aluminum or other metal or engineering plastic plate or sheet material. These wall portions are shown including a floor portion 52 which covers substantially all of the floor portion of the frame 26 to the rear of the vortex generator portion 38 and to the rear of the openings 54 defined laterally to the left and to the right of the rear corner posts of the vortex generator portion (which openings extend to the correspondingly-located upright posts of the left and right sidewall portions 32, 34). The left and right rear corners of the scoop 12 are provided with impervious baffle plates 56 which are cylindrically concave forwards about respective vertical axes and extend between respective corner posts of the left and right sidewall portion 32, 34, and the rear wall portion 36 of the frame 26. The baffle plates 56 are so arranged and extend sufficiently (e.g. through about 90° each), that each is intersected generally midway along its arcuate extent by an imaginary projection of the imaginary vertical plane of the respective flank of the apical vortex generator.

The wall portions of the scoop further include a longitudinally short leading edge or lip plate 58 which extends across the full width of the front end 16 of the scoop on the bottom wall portion of the frame 26, between the bases of the left and right sidewall portions 32, 34.

Further, the front side of the vortex generator portion of the frame is plated on both flanks by wall portions 60 which at the leading apex 62 are as tall as the vortex generator portion 38 of the frame. From the apex 62, the upper edges of the wall portions 60 slope obliquely down to the rear, along respective straight lines, so that at the rear corner posts of the vortex generator portion 38 of the frame 26, the wall portions 60 are only about three or four inches tall. The lower edges of the wall portions 60 reach the level of the floor portion 52 so as to cooperate therewith to enclose or box-in a corresponding rear portion of the scoop 12.

It is immaterial whether the floor portion of the wall portions extends behind the baffle plates 56.

For some uses of harvester, the scoop can be supported entirely by the mounting means, e.g. in a cantilevered manner. In other instances, users may wish to support some or nearly all of the weight of the harvester from the bottom of the body of water in which the harvesting is taking place. For such instances, the scoop 26 may further be provided with means for mounting ground-engaging wheels (and/or pontoons from which the scoop may be suspended). In the instance depicted, the further supports are provided in the form of left and right front corner post plates 64 between which a transversally, horizontally extending axle 66 is mounted and journalled for rotation, the axle 66 in turn mounting left and right wheels 68 which preferably have lugged or spiked running surfaces 70 which extend below the bottom 24 of the scoop 26, so that as the scoop 26 is maneuvered along in use, the bottom 24 is horizontal and the lip at its front is located only an inch or so above the bottom of the body of water (i.e. as close to the bottom as possible without becoming stuck in the mud or hung-up on local discontinuities, such as rocks).

The wall members which have been described hereinabove are secured to the respective frame members by welding or by use of other conventional fastening means (not illustrated in detail).

In the preferred embodiment, the included angle between the flanks of the vortex generator is about seventy-five degrees.

The scoop 26 further includes perforated wall means which may be constituted of netting or mesh wall means 72, made of suitable metal, plastic or fiber material, suitably attached to the frame and/or to the imperforate wall means which have been described hereinabove. The perforated wall means include perforations which will permit the passage therethrough of water, mud, sand and of creatures which through immaturity or kind are too small to be caught and marketed. The perforated wall means covers the left, right and rear sidewall members of the frame, and all of the bottom wall portion lying forwards of the bases of the left and right flanks of the vortex generator and forwards of the openings 54 to the left and to the right of the trailing edges of the vortex generator. (It is immaterial whether the left and right sidewall members of the frame 26 externally of the baffle plates 56 are covered by perforated wall means.)

One or more of the perforated or non-perforated left, right or rear sidewall panels (between adjacent upright struts of the frame 26), may be hinged or made removable (e.g. the left corner baffle plate 56 may be removably mounted), in order to permit the catch to be poured out of the scoop. Otherwise the scoop may be emptied through its open top by any convenient means.

In use, the scoop 12 is mounted to a propelling means such as to the front end loader mount of an aquatically-suited tractor, using the mounting means 14, and urged along forwards (in the direction of the travel arrow 74), either cantilevered from the mounting means, or, if wheels 68 are used, with the wheels 68 in engagement with the subaquatic geologic surface.

As the harvester is propelled along through the body of water, its own bottom 24 is supported at least slightly above the mud, plastic, gravel, concrete or whatever subaquatic geologic surface is in existence. Generally, the left, right and rear sidewalls will have their upper edges located at or above the upper surface of the body of water, although the harvester may be useful in a totally submerged condition for harvesting creatures which insist, even to their own detriment, on swimming or floating within a particular horizontal band of the water, e.g. benthic feeders. Much as a fisherman nets fish, in certain instances, by moving the net relative to the fish (rather than using a bait to attract the fish to a stationary site or acting on chance that current or schooling activity will cause the fish to traverse the stationary site of a net or trap), the harvester scoops in creatures through its open front end 16, whereupon the likelihood that they will escape, if they are of marketable size, is small. Rather, as the harvester continues to move forwards, the creatures are funneled rearwardly to the left and right by the corresponding flanks of the vortex generator 38, 60, while being confined by the left and right sidewalls 32, 34. Flow in this region tends to be laminar as indicated by the parallel arrows 76.

However, as the catch reaches the openings 54 and is swept rearwardly therethrough, the increase in velocity which results from the decrease in cross-sectional area of the flow path, coupled with the relationship of the curved baffle plates 56 to the leading surface of the vortex generator plates 60 causes the catch to swing around in eddies in the direction of arrows 78 and thus to become safely trapped in the stagnation area 80 located aftwardly of the vortex generator plates 60. Mass flow of water, on the other hand, passes out of the scoop, through the perforated rear wall covering 72, in the direction of arrows 82. Many aquatic creatures are tender and delicate, and will be damaged, limiting or preventing their being marketed at premium prices, if they are bruised, or have missing or broken parts. Accordingly, it is of great importance that the device 10, in normal intended use, causes the creatures being caught, immediately upon being swept through the openings 54, to be carried into a low flow, stagnant area 80, where they are unlikely to be bruised or broken. Upon completion of a pass through the body of water, or when the desired bulk of catch has become trapped in the stagnant area 80, the scoop is raised by raising the mounting means 14 and the harvester is propelled to an off-loading area where it is emptied, e.g. by tilting it to one side while opening the respective sidewall panel.

It should now be apparent that the aquacultural harvester for shallow water use as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A harvester for aquacultural use in gathering creatures from shallow water, comprising:
   a scoop including frame means defining a generally horizontal floor portion with upstanding left, right and rear wall portions provided thereon about an outer periphery thereof and a frontal opening;
   a vortex generator wall means disposed within said scoop and mounted on said frame means, said vortex generator wall means having two rearwardly-diverging upright flank walls which adjoin at a generally vertical apex located generally medially of said scoop near said frontal opening; said flank walls having trailing ends which are gapped laterally respectively from said left and right wall portions of said frame means of said scoop, and longitudinally from said rear wall portion of said frame means of said scoop, whereby said vortex generator wall means internally divides said scoop into a leading area disposed forwardly of said vortex generator wall means, and a trailing area disposed aftwardly of said vortex generator wall means, and including frontally open left and right openings into said trailing area laterally outwardly of respective ones of said trailing ends of said flank walls;
   said floor portion, left, right and rear wall portions of said frame means being covered by wall means which are sufficiently imperforate as to prevent escape therethrough of marketable creatures of a predetermined size;
   said wall means including left and right rear corner concave baffles curved about respective generally vertical axes and arranged to be intersected intermediate respective arcuate extents thereof by rearward-outward projections of imaginary front surface planes of respective ones of said flank walls;
   said wall means further including opening means for permitting egress of water from said scoop rearwardly of said trailing ends of said flank walls, whereby as the harvester is moved forwardly through a body of shallow water containing harvestable creatures of marketable size, water and creatures are introduced into the scoop through said frontal opening thereof and deflected along diverging paths each of which is rearwardly reduced in cross-sectional area, and therefore with increasing velocity, through respective ones of said openings into said trailing area, said creatures swing medially and forwardly due to effects on fluid flow caused by said concave baffles into a stagnant area defined as a portion of said trailing area located between said flank walls, and said water egresses from said scoop through said egress-permitting opening means.

2. The harvester of claim 1, wherein:
said wall means covering said floor portion of said frame means in said trailing area being substantially imperforate.

3. The harvester of claim 2, wherein:
said wall means covering said left, right and rear wall portions of said frame means including perforated portions.

4. The harvester of claim 3, wherein:
said wall means covering said floor portion of said frame means in said leading area including perforated portions.

5. The harvester of claim 2, wherein:
said wall means covering said floor portion of said frame means in said leading area including perforated portions.

6. Th harvester of claim 2, wherein:
said scoop is upwardly open.

7. The harvester of claim 2, wherein:
said flank walls of said vortex generator wall means decline in height from said apex towards said trailing ends.

8. The harvester of claim 7, wherein:
said flank walls are substantially imperforate.

9. The harvester of claim 2, wherein:
said flank walls are substantially imperforate up to a predetermined, elevated height from said wall means of said floor portion of said scoop.

10. The harvester of claim 2, further including:
mounting means provided on said frame means for mounting said harvester to an aquatically-useful propulsion-providing vehicle.

11. The harvester of claim 10, wherein:
said mounting means is provided on said rear wall portion of said frame means, whereby said harvester is adapted to be disposed forwardly of said propulsion-providing vehicle while being moved thereby through said shallow water.

12. The harvester of claim 1, further including:
downwardly depending rollable or skid device support means rotatably mounted to said frame means, whereby said scoop may be at least partially supported on a geologic bottom of a body of shallow water as said harvester is being moved along through said shallow water for harvesting marketable creatures therefrom.

13. The harvester of claim 12, wherein:
said rollable support means are wheels.

14. The harvester of claim 12, further including:

mounting means provided on said frame means for mounting said harvester to an aquatically-useful propulsion-providing vehicle.

15. The harvester of claim 14, wherein:
said mounting means is provided on said rear wall portion of said frame means, whereby said harvester is adapted to be disposed forwardly of said propulsion-providing vehicle while being moved thereby through said shallow water.

* * * * *